United States Patent
Shih et al.

(10) Patent No.: US 11,770,015 B2
(45) Date of Patent: Sep. 26, 2023

(54) POWER MANAGEMENT DEVICE AND METHOD

(71) Applicant: VIA LABS, INC., New Taipei (TW)

(72) Inventors: Terrance Shiyang Shih, Milpitas, CA (US); Chin-Sung Hsu, New Taipei (TW); Nai-Chuan Hung, New Taipei (TW)

(73) Assignee: VIA LABS, INC., New Taipei (TW)

( * ) Notice: Subject to any disclaimer, the term of this patent is extended or adjusted under 35 U.S.C. 154(b) by 347 days.

(21) Appl. No.: 17/110,312

(22) Filed: Dec. 3, 2020

(65) Prior Publication Data

US 2021/0305828 A1    Sep. 30, 2021

Related U.S. Application Data

(60) Provisional application No. 63/000,507, filed on Mar. 27, 2020.

(30) Foreign Application Priority Data

Oct. 26, 2020   (TW) .................................. 109137149

(51) Int. Cl.
*H02J 7/00* (2006.01)
*G06F 1/26* (2006.01)
(Continued)

(52) U.S. Cl.
CPC ............ *H02J 7/0048* (2020.01); *G06F 1/263* (2013.01); *G06F 1/3253* (2013.01); *G06F 13/4282* (2013.01); *H02J 2207/20* (2020.01)

(58) Field of Classification Search
CPC .. H02J 7/0048; H02J 2207/20; H02J 2207/30; H02J 7/00712; H02J 7/00034;
(Continued)

(56) References Cited

U.S. PATENT DOCUMENTS 11,283,265 B2   3/2022 Robinson et al.
11,569,655 B2 * 1/2023 Lin .................. G01R 19/16571
(Continued)

FOREIGN PATENT DOCUMENTS

CN    107346163    11/2017
TW    I606345    11/2017
(Continued)

OTHER PUBLICATIONS

"Office Action of Taiwan Counterpart Application", dated Aug. 6, 2021, p. 1-p. 3.
(Continued)

*Primary Examiner* — Stacy Whitmore
(74) *Attorney, Agent, or Firm* — JCIPRNET

(57) ABSTRACT

Power management device and method for a consumer product are provided. The power management device includes a memory, a configuration channel interface circuit and a control circuit. When a power supply device is electrically connected to a connector of the consumer product, the control circuit performs a power delivery protocol conforming to a USB specification on the power supply device through the configuration channel interface circuit and a configuration channel pin of the connector, so as to determine a power mode in which the power supply device supplies power to the consumer product. After the power delivery protocol is performed successfully, based on at least one protocol profile stored in the memory, the control circuit performs a vendor-defined messaging protocol on the power supply device through the configuration channel interface circuit and the configuration channel pin, so as to determine whether to change the power mode.

16 Claims, 3 Drawing Sheets

(51) Int. Cl.
*G06F 1/3234* (2019.01)
*G06F 13/42* (2006.01)

(58) Field of Classification Search
CPC .......... H02J 1/00; G06F 1/263; G06F 1/3253; G06F 13/4282; G06F 1/266; Y02D 10/00; H04L 67/025; H04L 67/12; H04L 67/30; H04L 69/08
See application file for complete search history.

(56) References Cited

U.S. PATENT DOCUMENTS

| | | | |
|---|---|---|---|
| 2015/0355696 A1* | 12/2015 | Pamley | G06F 1/3203 713/300 |
| 2016/0285757 A1* | 9/2016 | Srivastava | H04L 45/566 |
| 2016/0364360 A1* | 12/2016 | Lim | G06F 13/4282 |
| 2017/0046299 A1* | 2/2017 | Isaac | G06F 13/4282 |
| 2017/0139467 A1* | 5/2017 | Waters | G06F 13/385 |
| 2017/0277251 A1* | 9/2017 | Gong | G06F 1/28 |
| 2017/0293335 A1* | 10/2017 | Dunstan | H02J 50/10 |
| 2018/0054070 A1 | 2/2018 | Krishnamoorthy et al. | |
| 2018/0074574 A1* | 3/2018 | Camiolo | G06F 13/4282 |
| 2018/0375342 A1 | 12/2018 | Sultenfuss et al. | |
| 2019/0058346 A1* | 2/2019 | Lu | H02J 7/34 |
| 2020/0073349 A1* | 3/2020 | Yamaya | H02J 7/0045 |
| 2020/0083740 A1* | 3/2020 | Sultenfuss | H02J 7/34 |
| 2020/0159300 A1 | 5/2020 | Erturk et al. | |
| 2020/0403433 A1* | 12/2020 | Chung | G06F 11/327 |
| 2021/0109580 A1* | 4/2021 | Tseng | H01H 47/00 |
| 2021/0109884 A1* | 4/2021 | Lagnado | G06F 13/4068 |
| 2021/0232196 A1* | 7/2021 | Sultenfuss | H02J 7/02 |
| 2021/0232202 A1* | 7/2021 | Sultenfuss | H02J 1/084 |
| 2022/0164432 A1* | 5/2022 | Moritomo | G06F 21/81 |
| 2022/0404891 A1* | 12/2022 | Wang | G06F 1/3275 |

FOREIGN PATENT DOCUMENTS

| | | |
|---|---|---|
| TW | I626814 | 6/2018 |
| TW | 202030578 | 8/2020 |
| TW | I705325 | 9/2020 |
| TW | M609409 | 3/2021 |
| WO | 2015103767 | 7/2015 |
| WO | 2018014471 | 1/2018 |

OTHER PUBLICATIONS

"Office Action of Taiwan Related Application, Application No. 111127824", dated May 19, 2023, p. 1-p. 9.

* cited by examiner

POWER MANAGEMENT DEVICE AND METHOD

CROSS-REFERENCE TO RELATED APPLICATION

This application claims the priority benefit of U.S. provisional application No. 63/000,507, filed on Mar. 27, 2020, and Taiwan application no. 109137149, filed on Oct. 26, 2020. The entirety of each of the above-mentioned patent applications is hereby incorporated by reference herein and made a part of this specification.

TECHNICAL FIELD

The invention relates to a consumer product, and more particularly, to power management device and method for a consumer product.

BACKGROUND

In general, users will use a charger or an adapter to supply power to a consumer product, such as a desk lamp, a speaker or other consumer products. A connection interface between the charger and consumer product is generally a connector that conforms to a standard specification. For instance, the connection interface between the charger and the consumer product may be a USB type-A connector or a USB type-C connector of a universal serial bus (USB) specification. The manufacturer may formulate a special power source protocol to allow the charger (or the adapter) to provide a power greater than that of the standard specification to the consumer product. Based on the performed special power source protocol, a power mode between the charger (or the adapter) and the consumer product can be adjusted from a standard specification mode to a high power mode to increase an output power of the charger (or the adapter). When the power mode between the charger (or the adapter) and the consumer product is adjusted to the high power mode, the power greater than that of the standard specification can enable the charger (or the adapter) to provide the greater power to the consumer product.

However, different manufacturers often develop different power source protocols. For example, it is assumed that "Charger A" can perform "Power source protocol A" (but cannot perform "Power source protocol B"), and "Charger B" can perform "Power source protocol B" (but cannot perform "Power source protocol A"). When "Charger A" is electrically connected to a consumer product that can perform "Power source protocol A", based on "Power source protocol A", "Charger A" and the consumer product can operate in the high power mode. However, when "Charger B" is electrically connected to a consumer product that can perform "Power source protocol A", because the consumer product cannot perform "Power Protocol B", "Charger B" and the consumer product can only operate in a standard specification mode.

It should be noted that, the content in the paragraph "Description of Related Art" are intended to assist understanding the invention. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the invention.

SUMMARY

The invention provides power management device and method, which can perform a protocol corresponding to a power supply device to determine a power mode in which the power supply device supplies power to a consumer product.

In an embodiment of the invention, the power management device is adapted to be disposed in the consumer product. The power management device includes a memory, a configuration channel interface circuit and a control circuit. The memory is adapted to store at least one protocol profile. The configuration channel interface circuit is adapted to be coupled to a configuration channel pin of a connector of the consumer product. The control circuit is coupled to the configuration channel interface circuit and the memory. When a power supply device is electrically connected to a connector of the consumer product, the control circuit performs a power delivery protocol conforming to a USB specification on the power supply device through the configuration channel interface circuit and a configuration channel pin, so as to determine a power mode in which the power supply device supplies power to the consumer product. After the power delivery protocol is performed successfully, based on the protocol profile stored in the memory, the control circuit performs a vendor-defined messaging protocol on the power supply device through the configuration channel interface circuit and the configuration channel pin, so as to determine whether to change the power mode between the power supply device and the consumer product.

In an embodiment of the invention, the power management method is adapted to a consumer product. The power management method includes: storing at least one protocol profile by a memory of a power management device of the consumer product; when a power supply device is electrically connected to a connector of the consumer product, performing a power delivery protocol conforming to a USB specification on the power supply device through a configuration channel pin of the connector by the power management device, so as to determine a power mode in which the power supply device supplies power to the consumer product; and after the power delivery protocol is performed successfully, based on the protocol profile stored in the memory, performing a vendor-defined messaging protocol on the power supply device through the configuration channel pin by the power management device, so as to determine whether to change the power mode between the power supply device and the consumer product.

Based on the above, in an embodiment of the invention, the power management device can perform the first power source protocol in the bidirectional manner on the power supply device through the differential signal pin pair (e.g., the D+ pin and the D− pin of the USB connector) of the connector. When the first power source protocol is performed successfully, the power mode in which the power supply device supplies power to the consumer product can be changed to the high power mode. In another embodiment of the invention, after the power delivery (PD) protocol conforming to the USB specification is performed successfully by the power management device, the power management device can further perform the vendor-defined messaging (VDM) protocol on the power supply device through the configuration channel pin of the connector (e.g., the CC pin of the USB connector), so as to determine whether to change the power mode between the power supply device and the consumer product to the high power mode. In another embodiment of the invention, the protocol profiles corresponding to different power source protocols may be stored in the memory of the consumer product in advance. When the power supply device is electrically connected to the connector of the consumer product, the power management device can perform the PD protocol and the VDM protocol corresponding to the power supply device on the power supply device according to the different protocol profiles of the memory, so as to determine whether to further change the power mode between the power supply device and the consumer product to the high power mode. In this way, the power management device can perform the protocol corresponding to the power supply device to determine the power mode in which the power supply device supplies power to the consumer product. In addition, in an embodiment of the invention, the memory can also store traceability data to be read by an external electronic device (not shown) through the configuration channel pin of the connector and the configuration channel interface circuit. According to design requirements and/or application requirements, the traceability data includes a product model, a product serial number, manufacturing date information, manufacturer information, and (or) other related information/data related to the consumer product.

To make the aforementioned more comprehensible, several embodiments accompanied with drawings are described in detail as follows.

DETAILED DESCRIPTION

Figure 1:
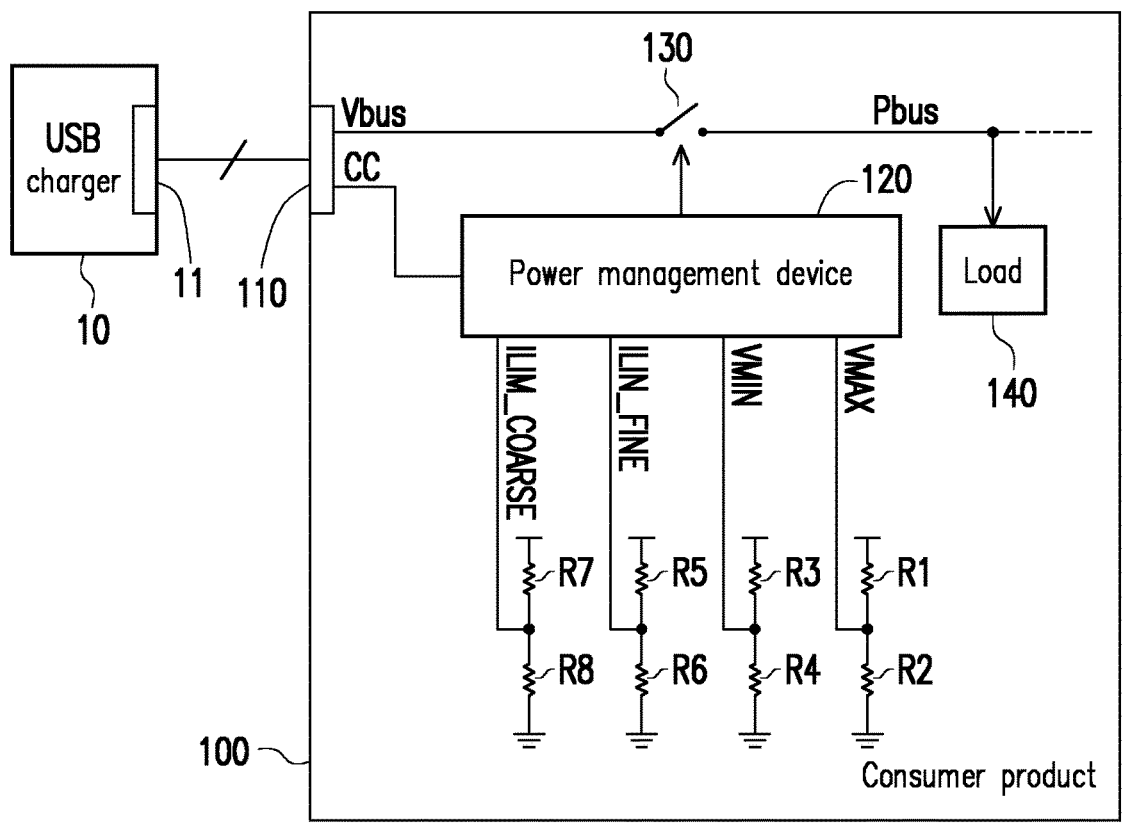
FIG. 1 is a circuit block diagram illustrating a consumer product according to an embodiment.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms such as "first", "second" and the like as recited in full text of the specification (including claims) are intended to give the elements names or distinguish different embodiments or scopes, and are not intended to limit an upper limit or a lower limit of the number of the elements nor limit an order of the elements. Moreover, wherever possible, elements/components/steps with same reference numerals represent same or similar parts in the drawings and embodiments. Elements/components/steps with the same reference numerals or names in different embodiments may be cross-referenced.

FIG. 1 is a circuit block diagram illustrating a consumer product 100 according to an embodiment. A USB type-C connector 110 of the consumer product 100 shown in FIG. 1 can be connected to a USB type-C connector 11 of a USB charger 10 through a cable. The USB charger 10 may be a USB adapter. When the USB charger 10 is electrically connected to the consumer product 100, the USB charger 10 can supply power to the consumer product 100.

The consumer product 100 includes a power management device 120, a power switch 130 and a load 140. In the case where the consumer product 100 has a desk lamp function, the load 140 may include a light emitting diode (LED), a human-machine interface circuit, and (or) other circuits/elements. In the case where the consumer product 100 has a speaker function, the load 140 may include a speaker, an amplifier circuit, a wireless communication circuit, and (or) other circuits/elements. An operating power required by the load 140 is provided by a main power bus Pbus.

The power management device 120 has a power delivery (PD) function that conforms to a USB specification. The power management device 120 can detect an electrical state of a CC (Configuration Channel) pin of the USB type-C connector 110, so as to determine whether the USB type-C connector 110 is connected to any external electronic device. When an external electronic device (e.g., the USB charger 10) is electrically connected to the USB type-C connector 110, the power management device 120 can exchange configuration information (e.g., a power profile) with the external electronic device through the CC pin of the USB type-C connector 110. Parameters of the power profile are determined by the resistors R1, R2, R3, R4, R5, R6, R7 and R8. The resistors R1 and R2 can provide a first voltage division level to a VMAX pin of the power management device 120 to determine a maximum voltage of the power profile. The resistors R3 and R4 can provide a second voltage division level to a VMIN pin of the power management device 120 to determine a minimum voltage of the power profile. The resistors R5 and R6 can provide a third voltage division level to a ILIM_FINE pin of the power management device 120 to determine a fine current level of the power profile. The resistors R7 and R8 can provide a fourth voltage division level to a ILIM_COARSE pin of the power management device 120 to determine a coarse current level of the power profile.

When the USB charger 10 is electrically connected to the USB type-C connector 110, the power management device 120 can perform a PD protocol with the USB charger 10 through the CC pin of the USB type-C connector 110. After a result of the PD protocol performed on the USB charger 10 by the power management device 120 is successful, the power management device 120 can turn on the power switch 130 of the consumer product 100, so as to transmit the power provided by the USB charger 10 to the main power bus Pbus of the consumer product 100 through a Vbus pin of the USB type-C connector 110 and the power switch 130. At this time, the USB charger 10 can supply power to the load 140 of the consumer product 100.

For the design/manufacturing stage, the resistors R1 to R8 provide flexibility to adjust the power profile. In any case, the resistors R1 to R8 are fixed on a circuit board of the consumer product 100. After the consumer product 100 is manufactured, the adjustment of the power profile of the consumer product 100 is no longer flexible. Furthermore, the resistors R1 to R8 will occupy a limited area of the circuit board and will increase the manufacturing cost of the consumer product 100. In addition, the power management device 120 needs to be configured with the VMAX pin, the VMIN pin, the ILIM_FINE pin and the ILIM_COARSE pin to connect the resistors R1 to R8, and these pins will increase the packaging cost of the power management device 120.

Figure 2:
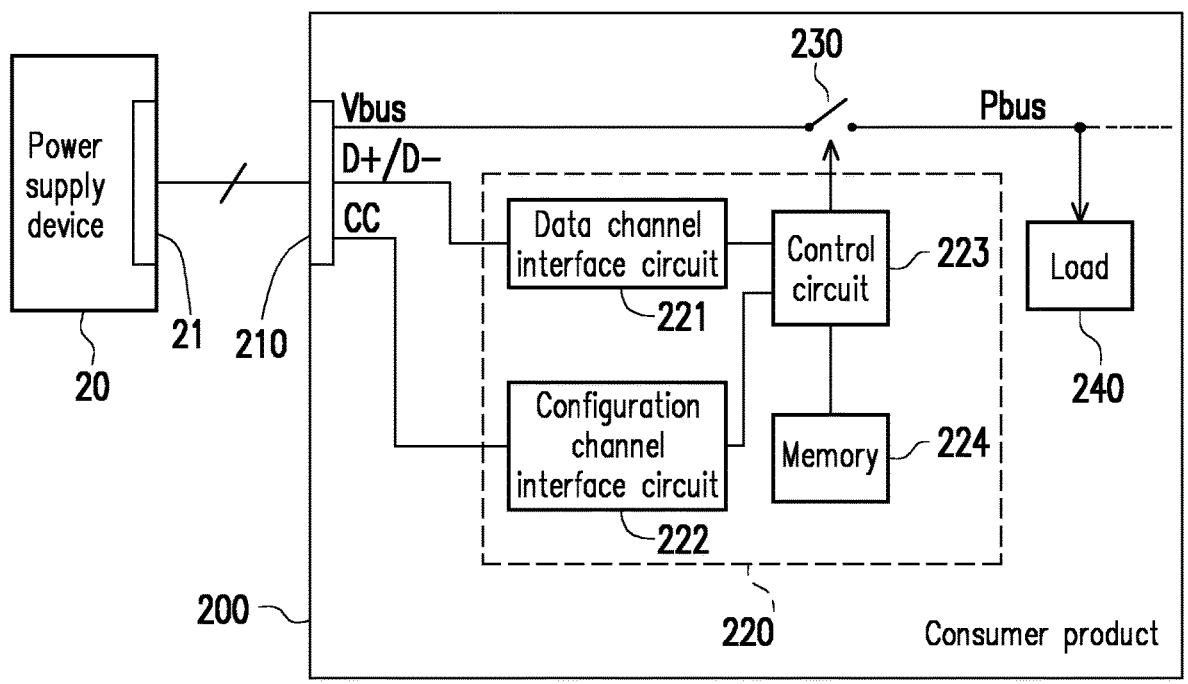
FIG. 2 is a circuit block diagram illustrating a consumer product according to an embodiment of the invention.

FIG. 2 is a circuit block diagram illustrating a consumer product 200 according to an embodiment of the invention. In the embodiment shown in FIG. 2, a connector 210 of the consumer product 200 may include the USB type-C connector. According to design requirements, in another embodiment, the connector 210 may include other types of USB connectors. In other embodiments, the connector 210 may include other electrical connectors. The connector 210 of the consumer product 200 shown in FIG. 2 can be connected to a connector 21 of a power supply device 20 through a cable. When the power supply device 20 is electrically connected to the consumer product 200, the power supply device 20 can supply power to the consumer product 200. According to application requirements, the power supply device 20 may include a USB charger, a USB adapter, or other power supply devices. In the case where the power supply device 20 is the USB charger or the USB adapter, the connector 21 may include the USB type-A connector, the USB type-C connector, and (or) other USB connectors.

The consumer product 200 includes a power management device 220, a power switch 230 and a load 240. In the case where the consumer product 200 has a desk lamp function, the load 240 may include a light emitting diode (LED), a human-machine interface circuit, and (or) other circuits/elements. In the case where the consumer product 200 has a speaker function, the load 240 may include a speaker, an amplifier circuit, a wireless communication circuit, and (or) other circuits/elements. An operating power required by the load 240 is provided by a main power bus Pbus of the consumer product 200.

The power management device 220 includes a data channel interface circuit 221, a configuration channel interface circuit 22, a control circuit 223 and a memory 224. According to design requirements, the memory 224 may include a OTP (One-Time Programming) memory, an electrically erasable programmable read only memory (EEPROM), and (or) other non-volatile memories. The memory 224 can store one or more protocol profiles and (or) power profiles. The power profile may include voltage parameters, current parameters, and (or) other power parameters.

In addition, according to design requirements, the memory 224 can also store traceability data to be read by an external electronic device (not shown) through the CC pin of the connector 210 and the configuration channel interface circuit 222. According to design requirements and/or application requirements, the traceability data includes a product model, a product serial number, manufacturing date information, manufacturer information, and (or) other information/data related to the consumer product 200.

The data channel interface circuit 221 is adapted to be coupled to a differential signal pin pair of the connector 210 of the consumer product 200. In the case where the connector 210 includes the USB connector, the differential signal pin pair may include a D+ pin and a D− pin of the USB connector, and the data channel interface circuit 221 may include a physical layer circuit of a differential data channel conforming to the USB specification. The control circuit 223 is further coupled to the data channel interface circuit 221. Through the data channel interface circuit 221, the control circuit 223 can detect the D+ pin and the D− pin of the connector 210 according to the USB specification.

Figure 3:
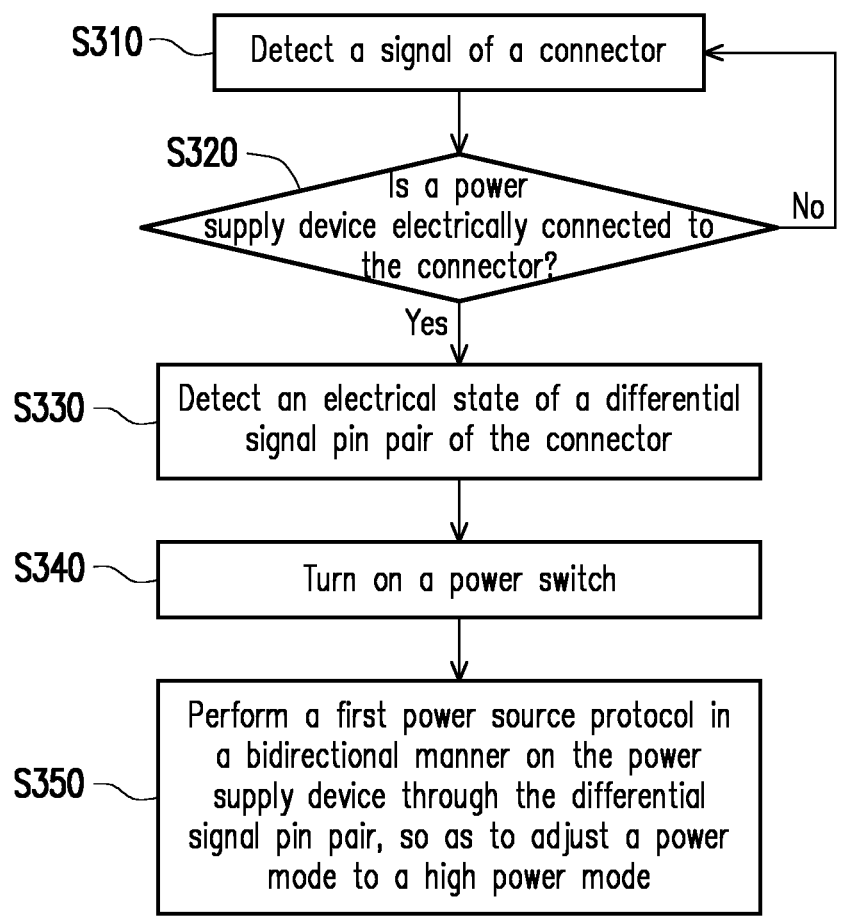
FIG. 3 is a flowchart of a power management method according to an embodiment of the invention.

FIG. 3 is a flowchart of a power management method according to an embodiment of the invention. In the embodiment shown in FIG. 3, the connector 21 of the power supply device 20 is assumed to be the USB type-A connector, that is, the connector 21 does not have the CC pin. Referring to FIG. 2 and FIG. 3, in step S310, the control circuit 223 can detect signals of the D+ pin and the D− pin of the connector 210 (an electrical state of the differential signal pin pair) through the data channel interface circuit 221, so as to learn whether an external electronic device is electrically connected to the connector 210. The details of the detection operation in step S310 can comply with the USB specification, and the USB specification belongs to the conventional art, which will not be repeated here.

When the external electronic device (e.g., the power supply device 20) is electrically connected to the connector 210 of the consumer product 200 (i.e., a determination result of step S320 is "Yes"), the control circuit 223 can perform step S330 to determine a power mode in which the power supply device 20 supplies power to the consumer product 200. In step S330, the control circuit 223 can detect the electrical state of the differential signal pin pair (the D+ in and the D− pin) of the connector 210 through the data channel interface circuit 221. The detection operation in step S330 includes: the external electronic device (e.g., the power supply device 20) applies an electrical signal conforming to the USB specification to the differential signal pin pair (the D+ in and the D− pin) of the connector 210 through the connector 21, or the external electronic device (e.g., the power supply device 20) makes the D+ in and the D− pin of the connector 210 enter a short circuit state, so as to set up the electrical state of the differential signal pin pair of the connector 210. The details of the detection operation of step S330 can comply with the USB specification, and the USB specification belongs to the conventional art, which will not be repeated here.

According to the electrical state of the differential signal pin pair of the connector 210, the control circuit 223 can turn on the power switch 230 of the consumer product 200 (step S340), so as to transmit the power provided by the power supply device 20 to the main power bus Pbus of the consumer product 200 through the connector 210 and the power switch 230. At this time, the power supply device 20 can supply power to the load 240 of the consumer product 200 according to the USB standard. Because the power supply device 20 unidirectionally sets up the electrical state of the differential signal pin pair of the connector 210, the operation of step S330 can be regarded as a power source protocol performed in a unidirectional manner.

After the power switch 230 is turned on, the control circuit 223 can perform a first power source protocol in a bidirectional manner on the power supply device 20 through the data channel interface circuit 221 and the differential signal pin pair (the D+ pin and the D− pin) of the connector 210 (step S350), so as to determine the power mode which the power supply device 20 supplies to the consumer product 200. For example, the first power source protocol may include the QC protocol of Q company, the SCP protocol of H company, the FCP protocol of H company, and (or) other power source protocols. The QC protocol, the SCP protocol and the FCP protocol belong to the conventional art, which will not be repeated here.

The first power source protocol of step S350 may be used to determine whether to further adjust the power mode from a standard power specification specified by the USB2.0 specification to a high power mode. Here, a power of the high power mode exceeds a power specified by a USB2.0 specification. When the power mode between the power supply device and the consumer product 200 is adjusted to the high power mode, the power greater than that of the standard specification can enable the power supply device 20 to provide the required greater power to the consumer product 200.

The first power source protocol of step S350 may include the following operations. The control circuit 223 can receive a protocol signal sent by the power supply device 20 through the data channel interface circuit 221 and the differential signal pin pair (the D+ pin and the D− pin) of the connector 210. Since different manufacturers often formulate different power source protocols, the protocol signals sent by the power supply devices 20 of different manufacturers may have different signaling patterns. The memory 224 can store one or more protocol profiles. The control circuit 223 can identify the protocol signal sent by the power supply device 20 based on the protocol profile stored in the memory 224 of the consumer product 200. Therefore, regardless of the power source protocol performed by the power supply device 20, the power management device 220 can successfully identify the protocol signal sent by the power supply device 20. In the future, if the power supply device 20 performs a new power source protocol, the user (the external electronic device, not shown) can also write (store) the protocol profile corresponding to the new power source protocol into the memory 224 through the CC pin of the connector 210 and the configuration channel interface circuit 222.

In the first power source protocol of step S350, when the control circuit 223 successfully identifies the protocol signal sent by the power supply device 20, the control circuit 223 can send an acknowledgement signal corresponding to the protocol signal to the power supply device 20 through the data channel interface circuit 221 and the differential signal pin pair (the D+ pin and the D− pin) of the connector 210. After the power supply device 20 receives the acknowledge signal corresponding to the protocol signal, the power supply device can adjust the power mode to the high power mode. Here, a power of the high power mode exceeds a power specified by a USB2.0 specification. When the control circuit 223 is unable to identify the protocol signal sent by the power supply device 20 or the power supply device 20 does not send the protocol signal, the power mode between the power supply device 20 and the consumer product 200 can be maintained in a standard specification power mode conforming to the USB2.0 protocol.

Referring to FIG. 2, the configuration channel interface circuit 222 is adapted to be coupled to the CC (Configuration Channel) pin of the connector 210 of the consumer product 200. In the case where the connector 210 includes the USB connector, the configuration channel interface circuit 222 can include a physical layer circuit of the CC pin conforming to the USB specification. The control circuit 223 is coupled to the configuration channel interface circuit 222. Through the configuration channel interface circuit 222, the control circuit 223 can detect the CC pin of the connector 210 according to the USB specification. The control circuit 223 has a power delivery (PD) function that conforms to the USB specification. The control circuit 223 can detect an electrical state of the CC pin of the connector 210 through the configuration channel interface circuit 222, so as to determine whether the connector 210 is connected to any external electronic device.

When an external electronic device (e.g., the power supply device 20) is electrically connected to the connector 210, the control circuit 223 can exchange configuration information (e.g., a power profile) with the external electronic device through the CC pin of the connector 210. Parameters of the power profile are determined by the profile stored by the memory 224. Therefore, the memory 224 provides flexibility to adjust the power profile. Compared with the embodiment shown in FIG. 1, the consumer product 200 shown in FIG. 2 does not need to be configured with the resistors R1 to R8, and the power management device 220 does not need to be configured with the VMAX pin, the VMIN pin, the ILIM_FINE pin and the ILIM_COARSE pin.

Because the user (the external electronic device, not shown) can write (store) new parameters into the memory 224 through the CC pin of the connector 210 and the configuration channel interface circuit 222 at any time, the adjustment of the power profile of the consumer product 200 is still flexible after the consumer product 200 is manufactured.

Figure 4:
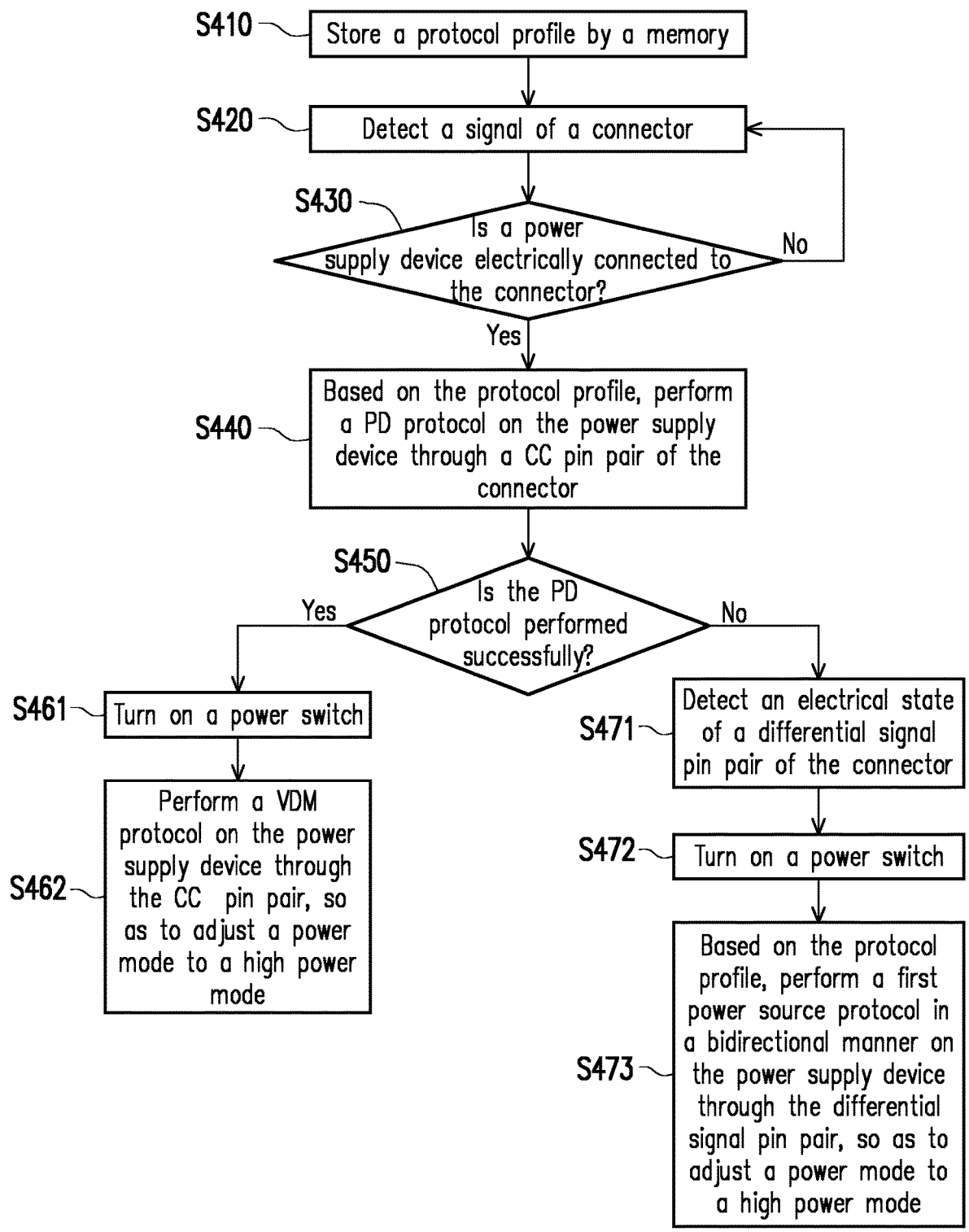
FIG. 4 is a flowchart of a power management method according to another embodiment of the invention.

FIG. 4 is a flowchart of a power management method according to another embodiment of the invention. In the embodiment shown in FIG. 4, the connector 21 of the power supply device 20 can be the USB type-A connector (without CC pins) or the USB type-C connector (with CC pins). Referring to FIG. 2 and FIG. 4, in step S410, the memory 224 can store one or more protocol profiles. In step S420, the control circuit 223 can detect signals of the D+ pin and the D− pin of the connector 210 (the electrical state of the differential signal pin pair) through the data channel interface circuit 221, and (or) detect a signal of the CC pin of the connector 210 (the electrical state of the CC pin) through the configuration channel interface circuit 222, so as to learn whether an external electronic device is electrically connected to the connector 210. The details of the detection operation of step S420 can comply with the USB specification, and the USB specification belongs to the conventional art, which will not be repeated here.

When the external electronic device (e.g., the power supply device 20) is electrically connected to the connector 210 of the consumer product 200 (i.e., a determination result of step S430 is "Yes"), the control circuit 223 can perform step S440 to determine a power mode in which the power supply device 20 supplies power to the consumer product 200. In step S440, the control circuit 223 can perform a power delivery (PD) protocol conforming to a USB specification on the power supply device 20 through the configuration channel interface circuit 222 and the CC pin of the connector 210. The PD protocol belongs to the conventional art, which will not be repeated here. The control circuit 223 can perform the PD protocol on the power supply device 20 based on the protocol profile stored in the memory 224 of the consumer product 200, so as to determine a power mode in which the power supply device 20 supplies power to the consumer product 200.

When a result of the PD protocol performed on the power supply device 20 by the control circuit 223 is successful (i.e., a determination result of step S450 is "Yes"), the control circuit 223 can perform step S461. In step S461, the control circuit 223 can turn on the power switch 230 of the consumer product 200, so as to transmit the power provided by the power supply device 20 to the main power bus Pbus of the consumer product 200 through the connector 210 and the power switch 230. At this time, the power supply device 20 can supply power to the load 240 of the consumer product 200 according to the USB standard.

After the PD protocol is performed successfully (after the power switch 230 is turned on), the control circuit 223 can perform step S462. In step S462, the control circuit 223 can perform a vendor-defined messaging (VDM) protocol on the power supply device 20 through the configuration channel interface circuit 222 and the CC pin of the connector 210. The control circuit 223 can perform the VDM protocol on the power supply device 20 based on the protocol profile stored in the memory 224 of the consumer product 200, so as to determine whether to further change the power mode in which the power supply device 20 supplies power to the consumer product 200.

The VDM protocol in step S462 may include the following operations. Based on the protocol profile stored in the memory 224, the control circuit 223 can send an inquiry signal corresponding to the power supply device 20 to the power supply device through the configuration channel interface circuit 222 and the CC pin of the connector 210, so as to ask whether the power supply device 20 supports the VDM protocol. After the power supply device 20 returns an acknowledge signal corresponding to the inquiry signal to the control circuit 223, the power mode between the power supply device 20 and the consumer product 200 can be adjusted to a high power mode. Here, a power of the high power mode exceeds a power specified by a PD specification. When the power mode between the power supply device 20 and the consumer product 200 is adjusted to the high power mode, the power greater than that of the standard specification can enable the power supply device 20 to provide the required greater power to the consumer product 200.

In the operation of step S462, when the protocol profile corresponding to the power supply device 20 does not exist in the memory 224, the power mode between the power supply device 20 and the consumer product 200 can be maintained in a standard specification power mode conforming to the PD protocol. That is to say, the power supply device 20 can maintain the power mode in the power mode determined by step S440.

When the power supply device 20 is electrically connected to the connector 210 of the consumer product 200, if the power delivery protocol is performed unsuccessfully or the CC pin is not electrically connected to the power supply device 20 (i.e., the determination result of step S450 is "No"), the control circuit 223 can perform steps S471, 472 and S473. Step S471, S472 and step S473 depicted in FIG. 4 may be deduced by analogy with reference to related description of step S330, S340 and step S350 depicted in FIG. 3, which will not repeated hereinafter.

In step S473, based on the protocol profile stored in the memory 224, the control circuit 223 can perform a first power source protocol in a bidirectional manner on the power supply device 20 through the data channel interface circuit 221 and the differential signal pin pair (the D+ pin and the D− pin) of the connector 210, so as to determine whether to further change the power mode between the power supply device 20 and the consumer product 200. The first power source protocol of step S473 may be used to determine whether to further adjust the power mode from a standard power specification specified by the USB2.0 specification to the high power mode. Here, a power of the high power mode exceeds a power specified by a USB2.0 specification. When the power mode between the power supply device 20 and the consumer product 200 is adjusted to the high power mode, the power greater than that of the standard specification can enable the power supply device 20 to provide the required greater power to the consumer product 200.

The first power source protocol of step S473 may include the following operations. The control circuit 223 can receive a protocol signal sent by the power supply device 20 through the data channel interface circuit 221 and the differential signal pin pair (the D+ pin and the D− pin) of the connector 210. The control circuit 223 can identify the protocol signal sent by the power supply device 20 based on the protocol profile stored in the memory 224. Therefore, regardless of the power source protocol performed by the power supply device 20, the power management device 220 can successfully identify the protocol signal sent by the power supply device 20. When the control circuit 223 successfully identifies the protocol signal sent by the power supply device 20, the control circuit 223 can send an acknowledgement signal corresponding to the protocol signal to the power supply device 20 through the data channel interface circuit 221 and the differential signal pin pair (the D+ pin and the D− pin) of the connector 210 so that the power supply device 20 adjusts the power mode to the high power mode. When the control circuit 223 is unable to identify the protocol signal sent by the power supply device 20 or the power supply device 20 does not send the protocol signal, the power mode between the power supply device 20 and the consumer product 200 is maintained in a standard specification power mode conforming to the USB2.0 protocol.

Based on the different design requirements, the blocks of the power management device 220 and (or) the control circuit 223 may be implemented in form of hardware, firmware, software or a combination of multiples among the three.

In form of hardware, the blocks of the power management device 220 and (or) the control circuit 223 may be implemented as logic circuits on an integrated circuit. The related functions of the power management device 220 and (or) the control circuit 223 may be implemented as hardware using hardware description languages (e.g., Verilog HDL or VHDL) or other suitable programming languages. For instance, the related functions of the power management device 220 and (or) the control circuit 223 may be implemented as various logic blocks, modules and circuits in one or more controllers, microcontrollers, microprocessors, application-specific integrated circuits (ASIC), digital signal processors (DSP), field programmable gate arrays (FPGA) and/or other processing units.

In form of software/firmware, the related functions of the power management device 220 and (or) the control circuit 223 may be implemented as programming codes. For example, the related functions of the power management device 220 and (or) the control circuit 223 may be implemented using common programming languages (e.g., C or C++) or other suitable programming languages. The programming codes may be recorded/stored in a recording medium. The recording medium includes, for example, a read only memory (ROM), a storage device and/or a random access memory (RAM). A computer, a central processing unit (CPU), a controller, a microcontroller or a microprocessor can read and execute the programming codes from the recording medium to achieve the related functions. A "non-transitory computer readable medium" (including a tape, a disk, a card, a semiconductor memory, a programmable logic circuits, etc.) may be used as the recording medium. Moreover, the programming codes may also be provided to the computer (or the CPU) via any transmission medium (a communication network or a broadcast wave). The communication network is, for example, Internet, a wired communication, a wireless communication or other communication media.

In summary, as described in the foregoing embodiments, the power management device 220 can perform the first power source protocol in the bidirectional manner on the power supply device 20 through the differential signal pin pair (e.g., the D+ pin and the D− pin of the USB connector) of the connector 210. When the first power source protocol is performed successfully, the power mode in which the power supply device 20 supplies power to the consumer product 200 can be changed to the high power mode. In another embodiment of the invention, after the PD protocol conforming to the USB specification is performed successfully by the power management device 220, the power management device 220 can further perform the VDM protocol on the power supply device 20 through the CC pin of the connector 210, so as to determine whether to further change the power mode between the power supply device 20 and the consumer product 200 to the high power mode. In another embodiment of the invention, the protocol profiles corresponding to different power source protocols may be stored in the memory 224 of the consumer product 200 in advance. When the power supply device 20 is electrically connected to the connector 210 of the consumer product 200, the power management device 220 can perform the PD protocol and the VDM protocol corresponding to the power supply device 20 on the power supply device 20 according to the different protocol profiles of the memory 224, so as to determine whether to further change the power mode between the power supply device 20 and the consumer product 200 to the high power mode. In this way, the power management device 220 can perform the protocol corresponding to the power supply device 20 to determine the power mode in which the power supply device 20 supplies power to the consumer product. Moreover, in an embodiment of the invention, the memory may also store the traceability data to be read by the external electronic device (not shown) through the configuration channel pin of the connector and the configuration channel interface circuit. According to design requirements and/or application requirements, the traceability data includes a product model, a product serial number, manufacturing date information, manufacturer information, and (or) other related information/data related to the consumer product.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A power management device adapted to be disposed in a consumer product, the power management device comprising:
 a memory, adapted to store at least one protocol profile;
 a configuration channel interface circuit, adapted to be coupled to a configuration channel pin of a connector of the consumer product;
 a control circuit, coupled to the configuration channel interface circuit and the memory, and
 a data channel interface circuit, adapted to be coupled to a differential signal pin pair of the connector, wherein the control circuit is further coupled to the data channel interface circuit, wherein
 when a power supply device is electrically connected to the connector of the consumer product, the control circuit performs a power delivery protocol conforming to a USB specification on the power supply device through the configuration channel interface circuit and the configuration channel pin, so as to determine a power mode in which the power supply device supplies power to the consumer product;
 after the power delivery protocol is performed successfully, based on the at least one protocol profile stored in the memory, the control circuit performs a vendor-defined messaging protocol on the power supply device through the configuration channel interface circuit and the configuration channel pin, so as to determine whether to change the power mode between the power supply device and the consumer product;
 when the power supply device is electrically connected to the connector of the consumer product, if the power delivery protocol is performed unsuccessfully or the configuration channel pin is not electrically connected to the power supply device, the control circuit detects an electrical state of the differential signal pin pair through the data channel interface circuit, and turns on a power switch of the consumer product according to the electrical state, so as to transmit a power provided by the power supply device to a main power bus of the consumer product through the connector and the power switch; and
 after the power switch is turned on, the control circuit performs a first power source protocol in a bidirectional manner on the power supply device through the data channel interface circuit and the differential signal pin pair, so as to determine whether to change the power mode in which the power supply device supplies power to the consumer product.

2. The power management device of claim 1, wherein the connector comprises a USB connector.

3. The power management device of claim 1, wherein the power supply device comprises a USB charger or a USB adaptor.

4. The power management device of claim 1, wherein the vendor-defined messaging protocol comprises:
 based on the at least one protocol profile stored in the memory, sending an inquiry signal corresponding to the power supply device to the power supply device through the configuration channel interface circuit and the configuration channel pin by the control circuit; and
 after the power supply device returns an acknowledge signal corresponding to the inquiry signal to the control circuit, adjusting the power mode between the power supply device and the consumer product to a high power mode, wherein a power of the high power mode exceeds a power specified by the power delivery protocol.

5. The power management device of claim 1, wherein when the at least one protocol profile corresponding to the power supply device does not exist in the memory, the power mode between the power supply device and the consumer product is maintained in a standard specification power mode conforming to the power delivery protocol.

6. The power management device of claim 1, wherein the first power source protocol comprises:
 receiving a protocol signal sent by the power supply device through the data channel interface circuit and the differential signal pin pair by the control circuit;
 identifying the protocol signal by the control circuit based on the at least one protocol profile stored in the memory;
 when the control circuit successfully identifies the protocol signal sent by the power supply device, sending an acknowledge signal corresponding to the protocol signal to the power supply device through the data channel interface circuit and the differential signal pin pair by the control circuit so that the power supply device adjusts the power mode to a high power mode, wherein a power of the high power mode exceeds a power specified by a USB2.0 specification; and
 when the control circuit is unable to identify the protocol signal sent by the power supply device or the power supply device does not send the protocol signal, maintaining the power mode between the power supply device and the consumer product in a standard specification power mode conforming to the USB2.0 protocol.

7. The power management device of claim 1, wherein the differential signal pin pair comprise a D+ pin and a D− pin of a USB connector.

8. The power management device of claim 1, wherein the memory further stores traceability data to be read through the configuration channel interface circuit and the configuration channel pin by an electronic device.

9. The power management device of claim 8, wherein the traceability data comprises at least one of a product serial number, manufacturing date information and manufacturer Information.

10. A power management method adapted to a consumer product, the power management method comprising:
    storing at least one protocol profile by a memory of a power management device of the consumer product;
    when a power supply device is electrically connected to a connector of the consumer product, performing a power delivery protocol conforming to a USB specification on the power supply device through a configuration channel pin of the connector by the power management device, so as to determine a power mode in which the power supply device supplies power to the consumer product;
    after the power delivery protocol is performed successfully, based on the at least one protocol profile stored in the memory, performing a vendor-defined messaging protocol on the power supply device through the configuration channel pin by the power management device, so as to determine whether to change the power mode between the power supply device and the consumer product;
    when the power supply device is electrically connected to the connector of the consumer product, if the power delivery protocol is performed unsuccessfully or the configuration channel pin is not electrically connected to the power supply device, detecting an electrical state of a differential signal pin pair of the connector by the power management device, and turning on a power switch of the consumer product according to the electrical state, so as to transmit a power provided by the power supply device to a main power bus of the consumer product through the connector and the power switch; and
    after the power switch is turned on, performing a first power source protocol in a bidirectional manner on the power supply device through the differential signal pin pair by the power management device, so as to determine whether to change the power mode in which the power supply device supplies power to the consumer product.

11. The power management method of claim 10, wherein the vendor-defined messaging protocol comprises:
    based on the at least one protocol profile stored in the memory, sending an inquiry signal corresponding to the power supply device to the power supply device through the configuration channel pin by the power management device; and
    after the power supply device returns an acknowledge signal corresponding to the inquiry signal to the power management device, adjusting the power mode between the power supply device and the consumer product to a high power mode, wherein a power of the high power mode exceeds a power specified by the power delivery protocol.

12. The power management method of claim 10, further comprising:
    when the at least one protocol profile corresponding to the power supply device does not exist in the memory, maintaining the power mode between the power supply device and the consumer product in a standard specification power mode conforming to the power delivery protocol.

13. The power management method of claim 10, wherein the first power source protocol comprises:
    receiving a protocol signal sent by the power supply device through the differential signal pin pair by the power management device;
    identifying the protocol signal by the power management device based on the at least one protocol profile stored in the memory;
    when the power management device successfully identifies the protocol signal sent by the power supply device, sending an acknowledge signal corresponding to the protocol signal through the differential signal pin pair by the power management device so that the power supply device adjusts the power mode to a high power mode, wherein a power of the high power mode exceeds a power specified by a USB2.0 specification; and
    when the power management device is unable to identify the protocol signal sent by the power supply device or the power supply device does not send the protocol signal, maintaining the power mode between the power supply device and the consumer product in a standard specification power mode conforming to the USB2.0 protocol.

14. The power management method of claim 10, wherein the differential signal pin pair comprise a D+ pin and a D− pin of a USB connector.

15. The power management method of claim 10, wherein the memory further stores traceability data to be read through the configuration channel pin by an electronic device.

16. The power management method of claim 15, wherein the traceability data comprises at least one of a product serial number, manufacturing date information and manufacturer Information.

* * * * *